March 28, 1961    M. F. McKEAG    2,976,763
MATERIAL LEVEL DETECTOR
Filed Sept. 16, 1957
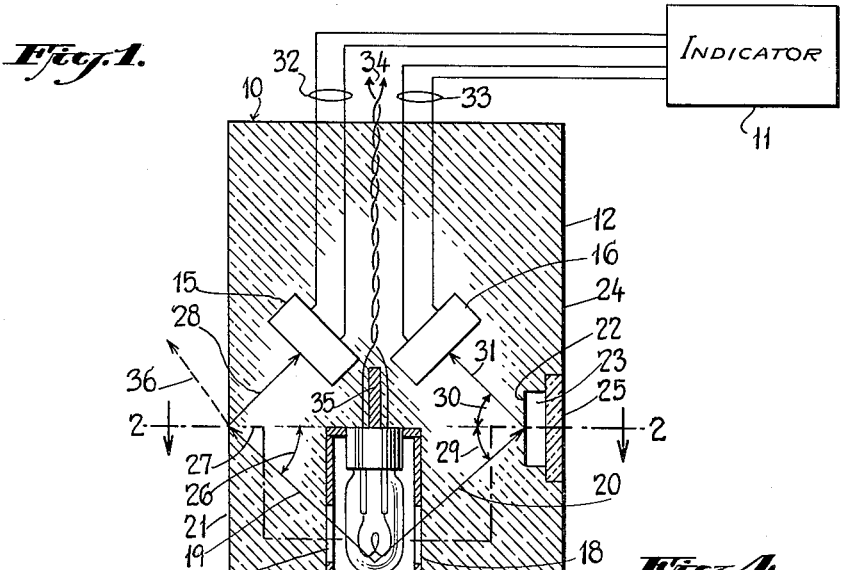
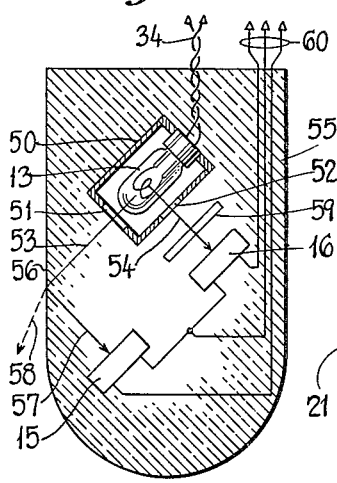
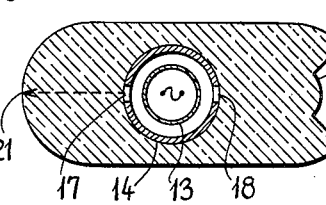
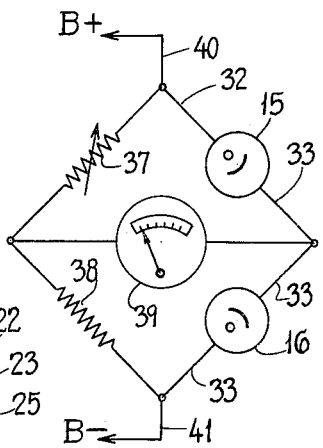
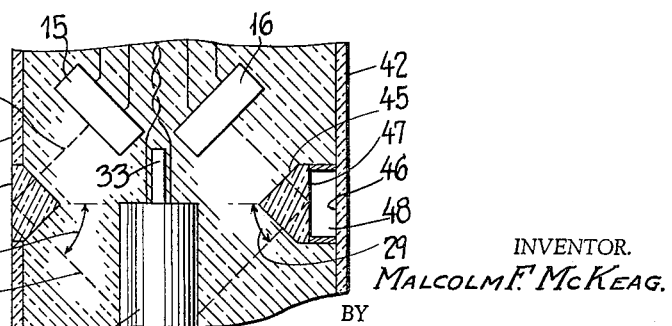
INVENTOR.
MALCOLM F. McKEAG.
BY
Ward, Neal, Haselton, Orme & McElhannon
ATTORNEYS.

United States Patent Office 2,976,763
Patented Mar. 28, 1961

2,976,763
MATERIAL LEVEL DETECTOR

Malcolm F. McKeag, Wallingford, Conn., assignor to Revere Corporation of America, Wallingford, Conn., a corporation of New Jersey Filed Sept. 16, 1957, Ser. No. 684,143

6 Claims. (Cl. 88—14)

This invention relates to apparatus for detecting the presence or absence of a material which has light reflecting or refracting characteristics which are different from similar characteristics of a standard or comparing material and relates particularly to liquid level indicators.

Apparatus which relies upon light refraction and reflection for the sensing of the presence or absence of materials, such as ice, water, oil, gasoline, etc., which have an index of light refraction different from a standard, e.g., air, are well known. In such devices one of the major difficulties has been the sensitivity of these devices to temperature changes and changes in the energizing source. Thus, in systems employing a photocell, a lamp and an electrical indicator, temperature changes affect the response of the photocell and the light emission of the lamp whereas, voltage changes affect these elements, and may also affect the reading of the electrical indicator. Such systems which are accurately calibrated at one temperature and voltage render inaccurate results at different temperatures and voltages and, therefore, are not entirely satisfactory and reliable for many purposes.

It is one object of this invention to provide apparatus for liquid level determination, ice formation detection and similar functions which reduces to a minimum or eliminates the above-mentioned disadvantages. The apparatus of this invention functions in a manner to provide accurate results uninfluenced by temperature change while including all the advantages that flow from the use of an optical system.

It is a further object of the invention to provide such apparatus which is small in size, unaffected by the material being measured and simple and economical to manufacture.

Other objects of the invention will be apparent from the following detailed description of the preferred embodiment of the invention which should be considered in conjunction with the accompanying drawings, in which:

Fig. 1 is a vertical section, partly diagrammatic, of the preferred form of the apparatus constructed in accordance with this invention;

Fig. 2 is a horizontal section of a portion of the apparatus shown in Fig. 1 and is taken along line 2—2 of Fig. 1;

Fig. 3 is a fragmentary vertical section showing a modified embodiment of the invention;

Fig. 4 is a circuit diagram of indicating apparatus which may be used with the apparatus of the invention; and Fig. 5 is a vertical section, partly diagrammatic, of another embodiment of the invention.

Figs. 1 and 2 illustrate the preferred embodiment of the invention which comprises a measuring probe 10 and an indicator 11. The measuring probe 10 comprises a solid housing 12 which may be made from any light-pervious material such as glass, quartz, synthetic resins, etc., but preferably is made of an synthetic resin such as Lucite. A lamp 13 enclosed by a housing 14 and a pair of light sensitive devices 15 and 16, which may, for example, be photocells, are embedded in the housing 12 forming a unitary probe. The housing 14 preferably is opaque, but has a pair of slits 17 and 18 therein for directing light beams represented by the lines 19 and 20 toward the exterior wall 21 of the housing 12 and toward the wall 22 of air chamber 23 which is disposed adjacent to the exterior wall 24 of the housing 12. As described hereinafter, the chamber 23 acts as a standard for providing a fixed amount of light reflection irrespective of the nature of the materials surrounding the housing 12, and the chamber 23 is closed at its outer side by means of an insert 25 which is sealed to the housing 12 so as to prevent the entrance or exit of gas or other fluids into or from the chamber 23.

It is well known that when light is directed toward an interface between two materials having different indices of refraction at an angle at least equal to the so-called "critical" angle, which is dependent upon the relationship of the indices, the light beam will be substantially totally reflected at the interface, and when the beam is directed at the interface at an angle less than the critical angle, the light beam will be at least partially transmitted through the interface. If the two materials have substantially the same index of reflection, substantially all of the light of the beam will pass beyond the interface and substantially none of the light will be reflected.

In accordance with the invention, the lamp 13 and the slit 17 in the housing 14 are so disposed with respect to the exterior wall 21 that the angle 26 between the light beam represented by the line 19 and the line 27, drawn perpendicular to the surface of the wall 21, is equal to or slightly greater than the critical angle of the wall 21 when air is adjacent the wall 21. Accordingly, when the probe 10 is in air, the light beam represented by the line 19 will be substantially totally reflected at the wall 21 and will follow a path represented by the line 28 and will be intercepted by the light-sensitive device 15.

Similarly, the lamp 13 and the slit 18 are so disposed with respect to the wall 22 that the path of the light beam represented by the line 20 will intersect the surface of the wall 22 at an angle 29 equal to or slightly greater than the critical angle of the wall 22, angle 29 being measured between the line 20 and the line 30 drawn perpendicular to the surface of the wall 22. With such an arrangement, the light of the beam represented by the line 20 will be substantially reflected at the wall 22 and will be directed along a path represented by the line 31. Accordingly, light reflected from the wall 22 will be intercepted by the light-sensitive device 16.

In order to concentrate the reflected light on the devices 15 and 16, the walls 21 and 22 are curved as shown in Fig. 2, but it will be understood that other shapes may be employed. Also, it will be understood that materials other than air may be employed in the chamber 23 and against the wall 21 in determining the positions of the slits 17 and 18 and the devices 15 and 16.

Light sensitive devices 15 and 16 may, as indicated above, be conventional photocells which either provide an output voltage dependent upon the amount of light received thereby or may change their resistance values dependent upon the amount of light received thereby. The devices 15 and 16 are connected by means of leads 32 and 33 to the indicator 11, which measures or responds to the output or resistance changes of the devices 15 and 16. The indicator 11 may be located adjacent to or remote from the probe 10.

The lamp 13 may be energized from a source (not shown) by means of the leads 34, and a baffle 35 is disposed between the devices 15 and 16, as shown, to prevent the reflected light following path 28 from affecting the device 16 and to prevent the reflected light following the path 31 from affecting the device 15.

As long as the probe 10 is in a medium or material, such as air, which has a substantially constant index of refraction, the amount of light reflected at the wall 21 will remain substantially constant. Of course, it will be noted that the amount of light reflected at the wall 22 is independent of the material surrounding the probe 10. However, when the air abutting or adjacent the portion of the wall 21, which is struck by the light beam 19 and which causes reflection of the beam along the path 28, is replaced by a material having a higher index of refraction and which causes the critical angle of the wall 21 to be greater than the angle 26, examples of such latter material being oil, gasoline, water, etc., at least a portion of the light beam 19 will pass out of the housing 12 and may, for example, follow the path represented by the dotted line 36. In such case, the light reflected along the path 28 will be diminished an amount depending upon the area of the reflecting portion of the wall 21 which abuts the material which replaces air and causing a decrease in the output or a change in the resistance of the light sensitive device 15.

One form of indicator 11 which may be employed to indicate the change in resistance of the light sensitive device 15 is illustrated schematically in Fig. 4 and comprises a Wheatstone bridge having the light sensitive devices 15 and 16 in one pair of the arms thereof and having a pair of resistors 37 and 38 in the other pair of arms thereof. An indicating meter 39 is connected between one pair of conjugate points on the bridge and direct current is supplied from a source (not shown) to the other conjugate points by means of leads 40 and 41.

With the probe 10 immersed in air and the lamp 13 energized, the resistor 37 may be adjusted to produce a predetermined reading on the meter 39. As long as the portion of the wall 21 which is struck by the light beam 19 is in air, the meter 39 will maintain the predetermined reading. Preferably, the reading corresponds to no current flowing through the meter 39 because in this way the meter reading will be uneffected by changes in the voltage of the source connected to the bridge by the leads 40 and 41. However, when a material having an index of refraction which will cause the critical angle at the portion of the wall 21 struck by the beam 19 to be greater than the angle 26, is placed in contact with such portion, the resistance of the device 15 will vary and meter 39 will indicate the presence of such other material.

Conversely, the meter 39 may be set by means of the resistor 37 to read a predetermined value when the probe 10 is immersed in the material whose presence it is desired to indicate. In such case a change in the reading of the meter 39 will indicate a change in the amount of such material abutting the wall 21.

It will be noted from the foregoing that changes in the amount of light produced by the lamp 13, due either to changes in the energizing voltage, changes in temperature or changes because of aging of the lamp 13, will effect both light sensitive device 15 and 16 by equal amounts. Furthermore, it is a relatively simple matter to select light-sensitive devices 15 and 16 having substantially identical sensitivities and temperature characteristics. Accordingly, the reading of the meter 39 will be substantially unaffected by changes in temperature at the measuring probe 10 and changes in the amount of light output of the lamp 13. Since the indicating circuits may be located remotely from the probe 10, they may be located where there is little temperature change or they may be temperature compensated readily.

In the preferred embodiment of the invention described above, the measuring probe is a unitary device in which the components are embedded in a solid housing. However, most of the advantages of the invention may also be obtained even though the probe is not a unitary device and the components thereof are not embedded in the housing. A modified form of the probe of the invention is illustrated in Fig. 3.

In Fig. 3 the housing 42 comprises a hollow shell which may, for example, be made of either a light-pervious or an opaque synthetic resin. The housing 14 containing the light source and the light sensitive devices 15 and 16 may be mounted within the housing 42 in any suitable manner and are disposed as described above in connection with the preferred embodiment. The end portions of the housing 42 have not been illustrated in the drawing, but it will be understood that the housing encloses the various components. A member 43 of light-pervious material, such as glass, quartz, a synthetic resin, etc., and preferably in the form of a prism, is mounted in one portion of the wall 44 of the housing 42 and is sealed therein so as to prevent the material being measured from entering within the housing 42. The outer wall of the member 43 acts to reflect light in the same manner as the exterior portion of the wall 21 described in connection with Fig. 1.

A second light-pervious member 45, similar to the member 43, is mounted on the opposite wall 46 of the housing 42. The standard material abuts the face or wall 47 of the member 45 and may, for example, be air in a sealed chamber 48. The operation of the modified embodiment shown in Fig. 3 is the same as the operation of the preferred embodiment described in connection with Figs. 1, 2 and 4.

It is well known that the index of refraction of a material varies with its temperature, and therefore, changes in the temperature under which the measuring probe is employed may cause changes in the amount of light reflected at the interfaces causing the reflection of the light. However, with the foregoing embodiments which employ a standard material or standard cell, the balance conditions will be substantially unaffected by changes in temperature because the index refraction of the standard material, which, preferably, is the same as the material adjacent the measuring surface at balance, will vary with temperature in the same manner as the index of refraction of the material adjacent the measuring surface at balance. However, under certain operating conditions the temperature will not vary over a relatively wide range, and therefore, the variation of the index of refraction with temperature may not cause significant variations in the amount of light reflected at the interface, and the use of a standard material or standard cell in the measuring increases the cost of and difficulties in manufacturing the probe. Accordingly, there is illustrated in Fig. 5 another embodiment of the invention which does not employ a standard material and which is useful in many applications.

In the embodiment illustrated in Fig. 5, the lamp 13 is enclosed by a housing 50 made of an opaque material and having a pair of slits 51 and 52 which permit light beams represented by lines 53 and 54 to pass through the housing 50. The lamp 13 and the housing 50, as well as the other components hereinafter described, may be encased in a solid housing 55, as illustrated in Fig. 5 and described above, or the housing 55 may be constructed in a manner similar to the housing 42 illustrated in Fig. 3.

The light beam 53 is oriented so that it strikes the surface 56 of the housing at an angle equal to or slightly greater than the critical angle at the surface 56 when air or other material is adjacent the surface 56 and is reflected along the path 57 to the light sensitive device 15 described above. When the air is replaced by a material having a higher index of refraction, at least a portion of the light beam 53 will be transmitted along the path 58, diminishing the light transmitted along the path 57 and thereby changing the electrical output or resistance of the light sensitive device 15.

The light beam 54 impinges directly on the light sensitive device 16 which provides an electrical output or resistance for comparison purposes in the manner described above. Since the light beam 54, when it strikes the device 16, will normally have a higher intensity than the light reflected along the path 57, it is desirable to insert a filter 59, such as a photographic gray filter, between the lamp 13 and the device 16 and in the path of the beam 54. Such a filter 59 permits adjustment of the intensity of the light impinging upon the device 16 so that the intensity of the light impinging on the device 16 may be made the same as the intensity of the reflected light transmitted along the path 57 under balance conditions. The light sensitive devices 15 and 16 may be connected to the indicator 11, described above, by means of conductors 60.

It will be observed, from a consideration of the embodiment illustrated in Fig. 5, that because of the elimination of the standard material or standard cell employed in the previously described embodiments, the size of the measuring probe may be reduced and the manufacture of the measuring probe is simplified and reduced in cost.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

I claim:

1. A measuring probe comprising: a housing comprising portions of light-pervious material, each portion having a surface, one said surface being unobstructed and forming a portion of the exterior surface of said housing and the other said surface having a standard abutting thereagainst, said standard being formed at the interface of said other surface and of a second material having a different index of refraction than said material of said surface whereby said standard has an index of refraction different from that of said material, means including a light source within said housing for directing a first light beam into one of said portions at such an angle as will cause said beam to be reflected by said one surface with a first predetermined material thereagainst having a predetermined index of refraction different from that of said material of said portions and for directing a second light beam into the other of said portions at such an angle as will cause said second beam to be reflected by said other surface, a first light sensitive device disposed within said housing to receive light reflected by said one surface and a second light sensitive device disposed within said housing to receive light reflected by said other surface whereby the amount of light reflected by said one surface will be altered and the amount of light reflected by said other surface will be substantially unaltered when said housing is surrounded by a second material having an index of refraction different from that of said first material.

2. Measuring apparatus comprising a housing having an outer portion thereof made of a light pervious material, one surface of said portion being an exterior surface of said housing, a light source mounted within said housing, means for directing a light beam from said source into said portion and at said surface at such an angle that said beam will be reflected at said surface with a first predetermined material thereagainst having a predetermined index of refraction different from that of said material of said portion, a first light sensitive device mounted within said housing and disposed so as to receive light reflected at said surface, a second light sensitive device mounted within said housing, and means spaced inwardly from the exterior of said housing for directing light from said source on said second device whereby the amount of light reflected by said surface will be altered and the amount of light directed on said second device will be substantially unaltered when said housing is surrounded by material having an index of refraction different from that of said first predetermined material.

3. A unitary, liquid impervious, measuring probe comprising a housing made of a light pervious material, a light source embedded in said material of said housing, means for directing light from said source through said material and at an exterior surface of said housing at such an angle that said beam will be reflected at said surface with a first predetermined material thereagainst having a predetermined index of refraction different from that of said materials of said housing, a first light sensitive device embedded in said material and disposed so as to receive light reflected at said surface, a second light sensitive device embedded in said material, and means spaced inwardly from the exterior of said housing for directing light from said source on said second device whereby the amount of light reflected by said surface will be altered and the amount of light directed on said second device will be substantially unaltered when said housing is surrounded by material having an index of refraction different from that of said first predetermined material.

4. A unitary liquid impervious measuring probe comprising: a housing of a predetermined material at least a portion of which is light pervious, said housing having first and second spaced, exterior walls and having a standard therein adjacent said second wall, said standard having an interface between materials having different indices of refraction, means embedded in said material of said housing including a light source and an opaque element constructed and arranged relatively to said light source to produce a pair of light beams, one of said beams being directed towards said first wall at an angle at least equal to the critical angle for said wall with a first predetermined material different from the material of said housing there-adjacent, and the other of said beams being directed towards said interface at an angle at least equal to the critical angle for asid interface, a first light sensitive device embedded in said material of said housing and positioned to intercept light reflected by said first wall, and a second light sensitive device embedded in said material of said housing and positioned to intercept the light reflected by said interface, said material of said housing being light pervious along the path of said one light beam from said means to said first wall and at the portion of said first wall at which said path terminates, and along the path of said other light beam from said means to said interface and along the paths of the light from said first wall and said interface to said light sensitive devices whereby the amount of light reflected by said first wall will be altered and the amount of light reflected by said interface will be substantially unaltered when said housing is surrounded by a second material having an index of refraction different from that of said first predetermined material.

5. A unitary liquid impervious measuring probe comprising: a housing of a light pervious material having a first predetermined index of refraction, said housing having first and second spaced, exterior walls and having a standard therein adjacent said second wall which standard comprises a first material having a predetermined index of refraction abutting a second material having a different predetermined index of refraction, means including a lamp embedded in said material of said housing for producing a pair of light beams, one of said beams being directed towards said first wall at an angle at least equal to the critical angle for said first wall with a first predetermined different material thereadjacent and the other of said beams being directed toward the abutting surfaces of the materials of said standard at an angle at least equal to the critical angle for said surfaces, a first light senstiive device embedded in said material of said housing and positioned to intercept the light reflected by said first wall, and a second light sensitive device embedded in said material of said housing and positioned to intercept the light reflected by said abutting surfaces, whereby the amount of light reflected by said first wall will be altered and the amount of light reflected by said abutting surfaces will be substantially unaltered when said housing is surrounded by a second material having an index of refraction different from that of said first predetermined material.

6. A unitary liquid impervious measuring probe comprising: a solid housing of a light pervious material having an index of refraction different from the index of refraction of air, said housing having first and second spaced, and opposite, convex exterior walls and having an air filled chamber therein adjacent said second wall, means embedded in said material of said housing and including a light source and an opaque element constructed and arranged relatively to said light source for producing a pair of light beams, one of said beams being directed towards said first wall at an angle at least equal to the critical angle for said first wall with air thereadjacent and the other of said beams being directed toward a wall of said chamber at an angle at least equal to the critical angle for said last mentioned wall with the air in said chamber thereadjacent, a first light sensitive device embedded in said material of said housing and positioned to intercept light reflected by said first wall, and a second light sensitive device embedded in said housing and positioned to intercept the light reflected by said wall of said chamber, whereby the amount of light reflected by said first wall will be altered and the amount of light reflected by said wall of said chamber will be substantially unaltered when said housing is surrounded by material having an index of refraction different from that of air.

References Cited in the file of this patent

UNITED STATES PATENTS

| | | |
|---|---|---|
| 2,032,010 | Goodwin | Feb. 25, 1936 |
| 2,032,128 | Horsfield | Feb. 25, 1936 |
| 2,240,988 | Hertel | May 6, 1941 |
| 2,350,712 | Barsties | June 6, 1944 |

UNITED STATES PATENT OFFICE

CERTIFICATION OF CORRECTION

Patent No. 2,976,763            March 28, 1961

Malcolm F. McKeag

It is hereby certified that error appears in the above numbered patent requiring correction and that the said Letters Patent should read as corrected below.

Column 1, line 69, for "an" read -- a --; column 2, line 23, for "reflection" read -- refraction --; column 6, line 35, for "asid" read -- said --; line 69, for "senstiive" read -- sensitive --.

Signed and sealed this 15th day of August 1961.

(SEAL)
Attest:

ERNEST W. SWIDER
Attesting Officer

DAVID L. LADD
Commissioner of Patents